US011421659B2

(12) United States Patent
Wang et al.

(10) Patent No.: US 11,421,659 B2
(45) Date of Patent: Aug. 23, 2022

(54) METHOD AND DEVICE FOR DETERMINING TOWER CLEARANCE FOR WIND TURBINE

(71) Applicant: BEIJING GOLDWIND SCIENCE & CREATION WINDPOWER EQUIPMENT CO., LTD., Beijing (CN)

(72) Inventors: Baifang Wang, Beijing (CN); Boyu Yang, Beijing (CN); Qingyang Cheng, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 43 days.

(21) Appl. No.: 16/976,403

(22) PCT Filed: Sep. 30, 2019

(86) PCT No.: PCT/CN2019/109391
§ 371 (c)(1),
(2) Date: Aug. 27, 2020

(87) PCT Pub. No.: WO2020/108088
PCT Pub. Date: Jun. 4, 2020

(65) Prior Publication Data
US 2021/0003114 A1 Jan. 7, 2021

(30) Foreign Application Priority Data
Nov. 30, 2018 (CN) .......................... 201811454363.7

(51) Int. Cl.
*G06T 7/60* (2017.01)
*F03D 17/00* (2016.01)

(52) U.S. Cl.
CPC ................ *F03D 17/00* (2016.05); *G06T 7/60* (2013.01); *F05B 2260/80* (2013.01); *F05B 2270/8041* (2013.01); *G06T 2207/10004* (2013.01)

(58) Field of Classification Search
CPC ... G06T 7/337; G06T 7/11; G06T 7/60; G06T 2207/20052; G06T 2207/10004;
(Continued)

(56) References Cited

U.S. PATENT DOCUMENTS 8,270,667 B2* 9/2012 Fritz ........................ F03D 80/50
382/100
10,378,517 B2* 8/2019 Bunge ..................... F03D 80/50
(Continued)

FOREIGN PATENT DOCUMENTS

CN   103982378 A   8/2014
CN   106286152 A   1/2017
(Continued)

OTHER PUBLICATIONS

Lihan He et al., Camera- based portable system for wind turbine blade tip clearance measurement, IEEE 978-1-4673-5791-3/13,2013. (Year: 2013).*
(Continued)

*Primary Examiner* — Sheela C Chawan

(57) ABSTRACT

A method and device for determining a tower clearance of a wind turbine. The method includes: acquiring an image of a wind turbine in operation (S10), the image comprising the tips of blades (2) and a tower (1) of the wind turbine; determining the positions of the tips of the blades (2) of the wind turbine in the image acquired (S20); identifying the edges of the tower (1) in the image acquired (30); and calculating, on the basis of the positions of the tips of the blades (2) and the edges of the tower (1) that have been
(Continued)

determined, the distance from the tips (2) of the blades (2) to the edges of the tower (1) to acquire a tower clearance (S40).

12 Claims, 9 Drawing Sheets

(58) Field of Classification Search
CPC ........... G06T 7/62; G06T 7/12; G06K 9/4671; G06K 9/6267; G06K 9/4642; G06K 2009/4666; G06K 2209/25; F03D 17/00; F05B 2260/80; F05B 2270/8041; F05B 2270/33
USPC ...... 382/100, 149, 156, 106; 416/1, 226, 11, 416/61, 238, 230, 228, 242
See application file for complete search history.

(56) References Cited

U.S. PATENT DOCUMENTS

| | | | |
|---|---|---|---|
| 2011/0135466 A1* | 6/2011 | Latorre | ...................... F03D 7/02 416/1 |
| 2012/0200699 A1 | 8/2012 | Bunge | |
| 2015/0043769 A1* | 2/2015 | Newman | ............. G06K 9/00637 382/100 |
| 2015/0322925 A1 | 11/2015 | Klitgaard et al. | |
| 2018/0003159 A1 | 1/2018 | Bunge | |
| 2020/0309092 A1* | 10/2020 | Bertolotti | .............. F03D 1/0633 |
| 2021/0088030 A1* | 3/2021 | Yang | ....................... F03D 17/00 |

FOREIGN PATENT DOCUMENTS

| | | |
|---|---|---|
| CN | 106762451 A | 5/2017 |
| CN | 207598432 U | 7/2018 |
| CN | 108506172 A | 9/2018 |
| WO | 2019110624 A1 | 6/2019 |

OTHER PUBLICATIONS

Australian Examination Report application No. 2019390462; dated Apr. 20, 2021.
Camera-Based Portable System for Wind Turbine Blade Tip Clearance Measurement, Lihan He et al., IEEE 978-1-4673-5791-3/13, 2013.
Supplementary European Search Report dated Jul. 19, 2021; Appln. No. 19890997.0.
International Search Report dated Dec. 27, 2019; PCT/CN2019/109391.

* cited by examiner

US 11,421,659 B2

METHOD AND DEVICE FOR DETERMINING TOWER CLEARANCE FOR WIND TURBINE

This application is the national stage of International Application No. PCT/CN2019/109391, titled "METHOD AND DEVICE FOR DETERMINING TOWER CLEARANCE FOR WIND TURBINE" and filed Sep. 30, 2019, which claims the benefit of and priority to Chinese Patent Application No. 201811454363.7, titled "METHOD AND DEVICE FOR DETERMINING TOWER CLEARANCE FOR WIND TURBINE" and filed on Nov. 30, 2018 with the China National Intellectual Property Administration (CNIPA), the entireties of which are hereby incorporated herein by reference in its entirety. Any disclaimer that may have occurred during the prosecution of the above-referenced applications is hereby expressly rescinded.

TECHNICAL FIELD

The present disclosure generally relates to the technical field of wind power, and particularly, to a method and an apparatus for determining a tower clearance of a wind turbine.

BACKGROUND

A tower clearance of a wind turbine refers to a distance from a tip of a blade to a surface of a tower during rotation of an impeller. For a wind turbine, it is required to replace a blade once the blade hits the tower. However, the cost of a single blade is higher, which increases maintenance cost. Moreover, the wind turbine needs to be shut down during replacement of the blade, which will result in loss of power generation during shut-down of the wind turbine. Therefore, a wind farm will have great economic losses once a blade hits the tower.

However, at present, the tower clearance of the wind turbine cannot be measured by a measuring tool, which leads to incapability of obtaining the tower clearance of the wind turbine in real time.

SUMMARY

A method and an apparatus for determining a tower clearance of a wind turbine are provided in an exemplary embodiment of the present disclosure, to solve a technical problem that the tower clearance of the wind turbine cannot be measured in the conventional technology.

In a general aspect, a method for determining a tower clearance of a wind turbine is provided, including: obtaining an image of a wind turbine during operation, where a tip of a blade and a tower of the wind turbine are captured in the image; determining a position of the tip of the blade of the wind turbine from the obtained image; recognizing an edge of the tower from the obtained image; and calculating a distance from the tip of the blade to the edge of the tower based on the determined position of the tip of the blade and the recognized edge of the tower, to obtain a tower clearance.

In another general aspect, an apparatus for determining a tower clearance of a wind turbine is provided, including: an image acquisition module, configured to obtain an image of a wind turbine during operation, where a tip of a blade and a tower of the wind turbine are captured in the image; a blade tip detection module, configured to determine a position of the tip of the blade of the wind turbine from the obtained image; a tower edge recognition module, configured to recognize an edge of the tower from the obtained image; and a tower clearance determination module, configured to calculate a distance from the tip of the blade to the edge of the tower based on the determined position of the tip of the blade and the recognized edge of the tower, to obtain a tower clearance.

In another general aspect, a system for monitoring a tower clearance is provided, including: an image capture device, configured to capture an image of a blade of a wind turbine during operation; and a processor, configured to: obtain an image in which captured a tip of the blade and a tower of the wind turbine from the captured image; determine a position of the tip of the blade of the wind turbine from the obtained image; recognize an edge of the tower from the obtained image; and calculate a distance from the tip of the blade to the edge of the tower based on the determined position of the tip of the blade and the recognized edge of the tower, to obtain a tower clearance.

In another general aspect, a computer readable storage medium with computer programs stored thereon is provided, where the computer programs, when executed by a processor, implements the method for determining a tower clearance of a wind turbine described above.

With the method and apparatus for determining a tower clearance of a wind turbine according to exemplary embodiments of the present disclosure, the tower clearance of the wind turbine can be determined in real time, so as to effectively avoid a hit between a blade and a tower.

BRIEF DESCRIPTION OF THE DRAWINGS

The above and other objects, as well as features of the present disclosure will become clearer in the description in conjunction with following drawings.

DETAILED DESCRIPTION

Figure 1:
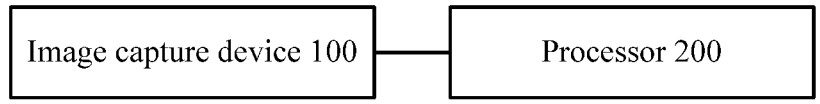
FIG. 1 illustrates a block diagram of a system for monitoring a tower clearance according to an exemplary embodiment of the present disclosure.

Different exemplary embodiments will now be more fully described with reference to the drawings, some of which are illustrated in the drawings.

Figure 2:
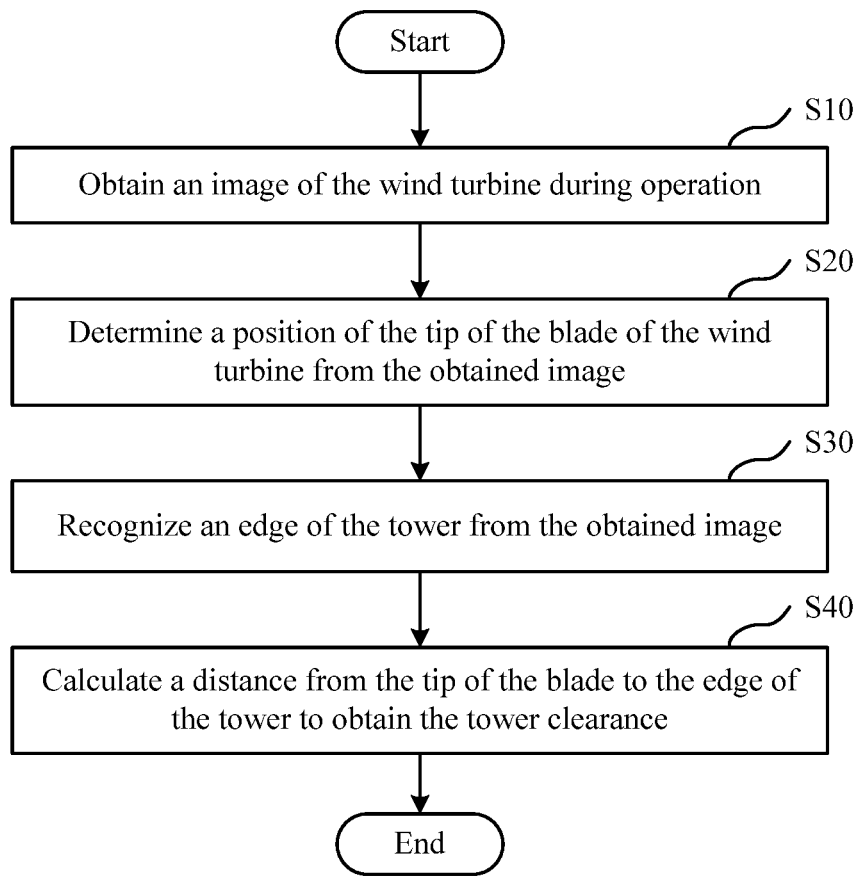
FIG. 2 illustrates a flow chart of a method for determining a tower clearance of a wind turbine according to an exemplary embodiment of the present disclosure.

FIG. 1 illustrates a block diagram of a system for monitoring a tower clearance according to an exemplary embodiment of the present disclosure. FIG. 2 illustrates a flow chart of a method for determining a tower clearance of a wind turbine according to an exemplary embodiment of the present disclosure.

As illustrated in FIG. 1, the system for monitoring a tower clearance according to the exemplary embodiment of the present disclosure includes an image capture device 100 and a processor 200. The image capture device 100 is configured to capture an image of a blade of a wind turbine during operation, and the processor 200 is configured to perform the method for determining a tower clearance of a wind turbine illustrated in FIG. 2.

A process of determining a tower clearance of a wind turbine is described as follows in conjunction with FIGS. 1 and 2.

As illustrated in FIG. 2, in step S10, an image of the wind turbine is obtained during operation. A tip of a blade and a tower of the wind turbine are captured in the obtained image.

For example, the image capture device 100 captures the image of the blade of the wind turbine during operation. An image of the tip of the blade and the tower of the wind turbine included in the image captured by the image capture device 100 is determined as an image for analysis on the tower clearance. Subsequently, the tip of the blade and the tower are recognized on the image used for tower clearance analysis.

That is to say, the image used for tower clearance analysis is the image of the tip of the blade and the tower of the wind turbine included in the captured image. Here, since the tower clearance refers to a distance between the tip of the blade and a surface of the tower during rotation of an impeller, in order to determine a value of the tower clearance, it is necessary to analyze the image including the tip of the blade and the tower of the wind turbine to determine the tower clearance.

As an example, the image capture device 100 may include but not limited to a camera or a laser two-dimensional (2D) scanner, used for capturing the image of the blade of the wind turbine during operation.

In a preferred embodiment, when the image capture device 100 is a camera, the camera can take a video of the blade of the wind turbine during the operation. Then each frame image of the captured video is recognized, so as to recognize the image used for tower clearance analysis from each frame image. That is to say, continuous multi-frame images of the blade of the wind turbine during operation can be obtained by shooting a video, and then the image including the tip of the blade and the tower is recognized from each frame image, so as to perform the subsequent tower clearance analysis. In this way, real-time monitoring of the tower clearance by means of a video is realized.

It should be understood that, various image recognition methods may be used to recognize the image captured by the image capture device 100, to recognize the image including the tip of the blade and the tower of the wind turbine from the captured image, and to determine the recognized image to be the image used for the tower clearance analysis.

As an example, the captured image may be recognized through template matching. For example, multiple template images marked with the tip of the blade and the tower of the wind turbine may be created in advance, and the captured image is compared with the multiple template images.

Specifically, the multiple template images marked with the tip of the blade and the tower may be stacked on the image captured by the image capture device 100 for template matching. When an image in the captured image is matched with any one of the multiple template images, the matched image is determined as the image including the tip of the blade and the tower of the wind turbine, that is, the matched image is determined as the image used for the tower clearance analysis. However, it should be understood that the above method for performing image recognition through template matching is only an example, and the present disclosure is not limited thereto, and other image recognition methods are also feasible.

The image capture device 100 may be installed at a reasonable position, such that the image capture device 100 is able to capture the image including the tip of the blade and the tower of the wind turbine. Two examples of installing the image capture device 100 are described below.

In a first example, the image capture device 100 may be installed at a bottom of a nacelle of the wind turbine, to capture the image including the tip of the blade and the tower of the wind turbine.

Figure 3:
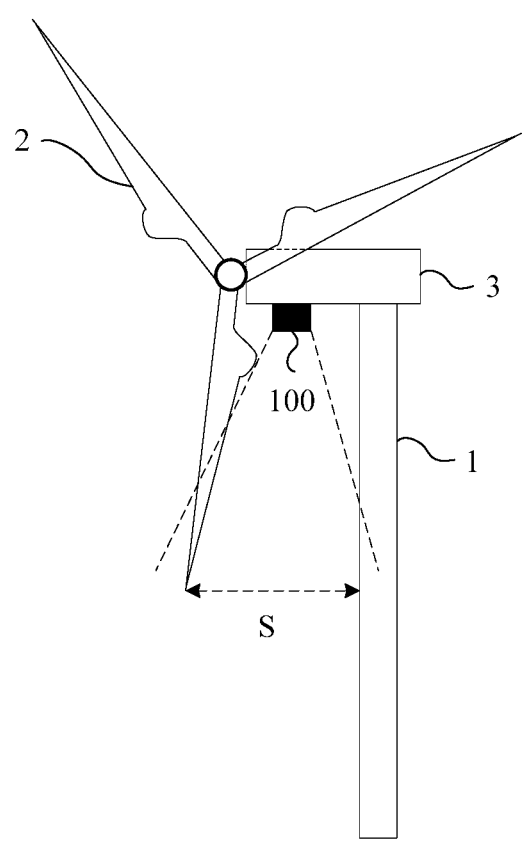
FIG. 3 illustrates a schematic view of an arrangement location of an image capture device according to a first exemplary embodiment of the present disclosure.

FIG. 3 illustrates a schematic view of an installation position of an image capture device according to a first exemplary embodiment of the present disclosure.

As illustrated in FIG. 3, the image capture device 100 may be provided at the bottom of the nacelle 3 of the wind turbine, that is, the image capture device 100 may be provided in an area between the tower 1 and a hub at a bottom of a housing of the nacelle 3, to capture the image including the tip of the blade 2 and the tower 1 when the blade 2 is rotated to be within an angle range for effective measurement of the clearance.

That is to say, a relative positional relationship between the image capture device 100 and the wind turbine may be adjusted, so that when the blade is located within the angle range for effective measurement of the clearance, the tip of the blade can just be within an image capture range of the image capture device 100.

Here, the angle range for effective measurement of the clearance described above may be a predetermined angle range. For example, the angle range for effective measurement of the clearance may refer to a predetermined angle range around an azimuth angle of the impeller when the tip of the blade is perpendicular to the ground, in other words, the angle range for effective measurement of the clearance refers to a sector shape with the tower as a line of symmetry and a radius and the predetermined angle as a center angle.

Preferably, a stand may be provided at the bottom of the nacelle 3 of the wind turbine, to fix the image capture device 100 on the stand. However, the present disclosure is not limited to this, and the image capture device 100 may be directly installed on the bottom of the housing of the nacelle 3 without a stand.

Here, taking the image capture device 100 as a camera as an example, since a length of a blade of a wind turbine generally exceeds 60 meters (m), in order to achieve accurate measurement of the tower clearance 60 meters away, a camera with a focal length of more than 20 millimeters (mm) may be selected. In other words, the tip of the blade 2 and the tower 1 can be within the shooting range of the camera by adjusting the installation position of the camera and/or selecting a camera with an appropriate focal length, so as to capture the image with high-quality for tower clearance analyze.

Since a speed of the tip of the blade exceeds 80 seconds/meter (m/s) when the wind turbine is in a full power, the tip of the blade will appear in a shooting range of the camera for about 300 milliseconds (ms). In order to ensure that the camera can capture the image including the tip of the blade within 300 milliseconds, a camera with a frame rate of more than 20 Hz may be selected.

Since the tower clearance needs to be monitored in real time at night, preferably, the camera should also have a night vision function. As an example, an irradiation distance of the camera's infrared fill light should reach 200 meters.

It should be understood that the various parameter values and functions of the camera selected in the exemplary embodiment of the present disclosure described above are only exemplary, and the present disclosure is not limited thereto. Those skilled in the art may adjust the above parameter values according to actual needs to select a suitable camera, as long as the camera can capture the image including the tip of the blade and the tower of the wind turbine.

Figure 4:
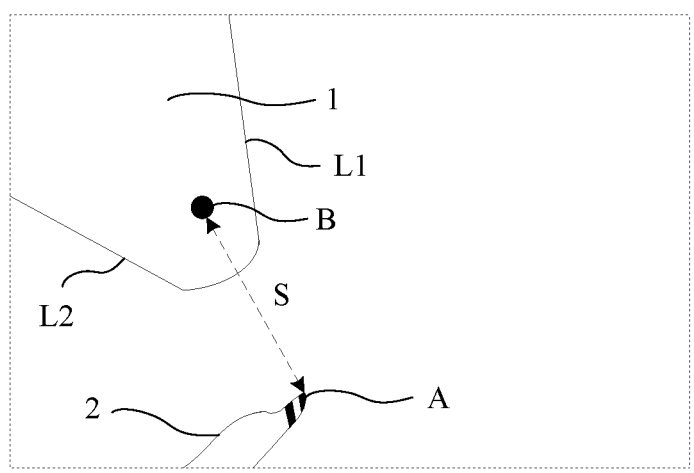
FIG. 4 illustrates a schematic view of an image captured by the image capture device according to the first exemplary embodiment of the present disclosure.

FIG. 4 illustrates a schematic view of an image captured by the image capture device according to the first exemplary embodiment of the present disclosure.

FIG. 4 illustrates an image, captured by the image capture device 100, including the tip A of the blade 2 and the tower 1, when the image capture device 100 is set at the bottom of the nacelle 3. The tower clearance S may be determined by recognizing the image shown in FIG. 4. A detailed process of tower clearance analysis for the image illustrated in FIG. 4 will be described later.

In a second example, the image capture device 100 may be arranged in a designated area located on a side of the wind turbine and at a predetermined distance from the wind turbine, to capture the image including the tip of the blade and the tower the wind turbine.

Figure 5:
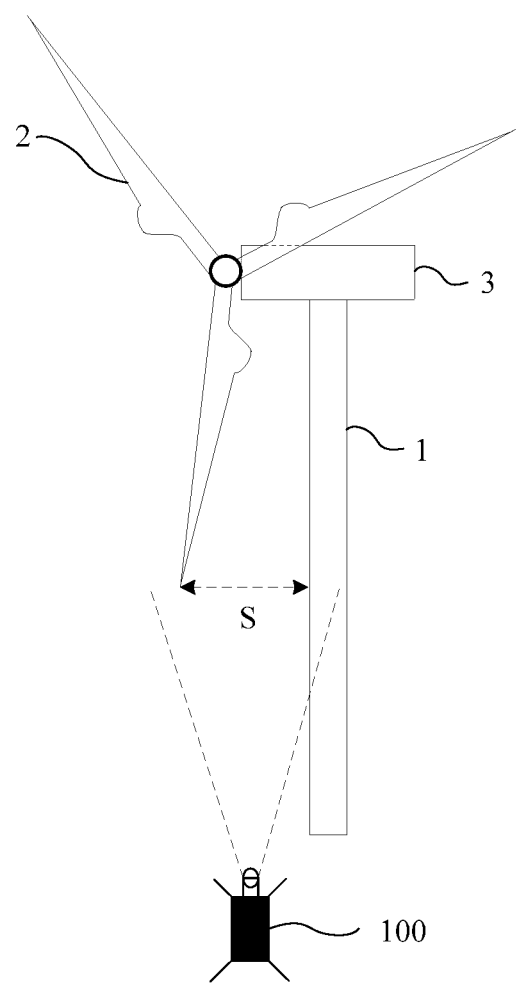
FIG. 5 illustrates a schematic view of an arrangement location of an image capture device according to a second exemplary embodiment of the present disclosure.

FIG. 5 illustrates a schematic view of an installation position of an image capture device according to a second exemplary embodiment of the present disclosure.

As illustrated in FIG. 5, the image capture device 100 may be arranged in the designated area on the side of the wind turbine. Preferably, a stand may be provided in the designated area to adjust a height and a capture angle of the image capture device 100, such that the image capture device 100 is able to capture the image including the tip of the blade 2 and the tower 1.

Since an operating environment of the wind turbine is relatively harsh, in order to enable the image capture device 100 to capture clear and stable images, a protection device may be provided in the designated area on the side of the wind turbine, to reduce an impact on the image capture process of the image capture device 100 in the harsh environment.

Figure 6:
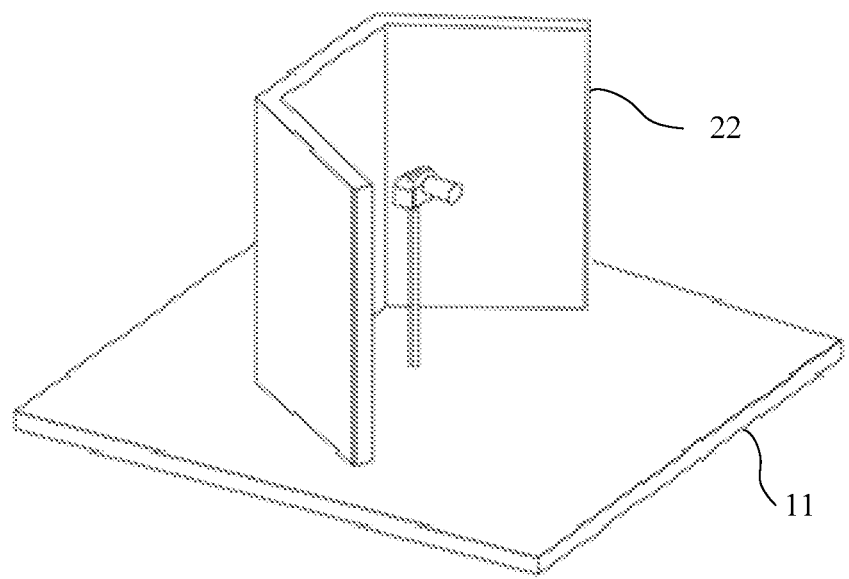
FIG. 6 illustrates a schematic view of a protection device for protecting the image capture device according to the second exemplary embodiment of the present disclosure.

FIG. 6 illustrates a schematic view of a protection device for protecting the image capture device according to the second exemplary embodiment of the present disclosure.

As illustrated in FIG. 6, the protection device may include a support plate 11 and a baffle 22. The support plate 11 is used to fix the image capture device 100, and a shooting height of the image capture device 100 may be adjusted by adjusting a height of the support plate 11 from the ground. The baffle 22 is a three-sided baffle used to protect the image capture device 100 on three sides, so that the image capture device 100 is not easily affected by severe windy weather. As an example, the baffle 22 may be a trapezoidal three-sided baffle.

It should be understood that a form of the protection device illustrated in FIG. 6 is only an example, and the present disclosure is not limited thereto. Those skilled in the art may determine a shape and size of the support plate and the baffle according to needs. In addition, those skilled in the art may also choose other styles of protection devices to protect the image capture device 100. For example, a shielding plate may be provided above the image capture device 100, or a transparent protective cover may be provided around the image capture device 100.

Figure 7:
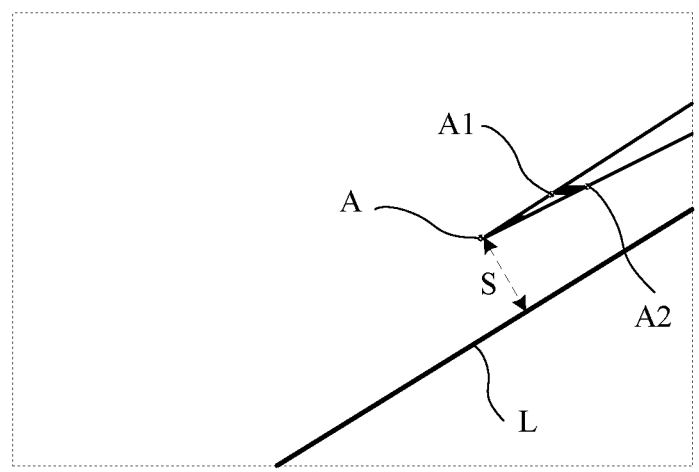
FIG. 7 illustrates a schematic view of an image captured by the image capture device according to the second exemplary embodiment of the present disclosure.

FIG. 7 illustrates a schematic view of an image captured by the image capture device according to the second exemplary embodiment of the present disclosure.

FIG. 7 illustrates an image including the tip A of the blade and the tower, captured by the image capture device 100 when the image capture device 100 is arranged in the designated area on the side of the wind turbine. The tower clearance S may be determined by recognizing the image illustrated in FIG. 7. A detailed process of tower clearance analysis for the image illustrated in FIG. 7 will be described later.

It should be understood that the two examples of the installation position of the image capture device 100 described above are only preferred examples, and the present disclosure is not limited to this. Those skilled in the art may change the installation position of the image capture device according to actual needs. For example, the image capture device may also be provided on the tower, so that the image capture device can shoot from top to bottom along a tower direction or from bottom to top along the tower direction, to obtain an image that can be used for tower clearance analysis.

As an example, the processor 200 may be provided in the nacelle of the wind turbine for processing the image captured by the image capture device 100. Alternatively, the processor 200 may also be located in a monitoring center (or a dispatch center) of a wind farm. At this time, the image capture device 100 may directly send the captured image to the processor 200. Or, the image capture device 100 may also send the captured image to a controller of the wind turbine, and the controller transmits the received image to the processor 200 for tower clearance analysis.

In addition, in order to ensure real-time monitoring of the tower clearance of the wind turbine, it is also necessary to reduce time consumption of the overall system for monitoring the tower clearance during communication transmission as much as possible. Preferably, data transmission may be performed between the image capture device 100 and the processor 200 in a wired manner. For example, the image capture device 100 may send the captured image to the processor 200 by means of a bus. However, the present disclosure is not limited to this, and data transmission between the image capture device 100 and the processor 200 may also be performed in a wireless manner.

Here, since the installation position of the image capture device 100 is fixed, the relative positional relationship between the image capture device 100 and the wind turbine is also fixed. Thus, in the image captured by the image capture device 100, it is also relatively fixed with respect to which area may contain the tower and which area may contain the blade.

In view of the above, in a preferred embodiment, the method for determining the tower clearance of the wind turbine according to an exemplary embodiment of the present disclosure may further include: extracting, from the obtained image for tower clearance analysis, a first sensitive area for detecting the tip of the blade and a second sensitive area for recognizing the edge of the tower. Subsequently, the tower clearance analysis may be performed on the extracted first sensitive area and the second sensitive area.

Returning to FIG. 1, in step S20, a position of the tip of the blade of the wind turbine is determined from the obtained image.

For the above-mentioned case where the first sensitive area is extracted from the image used for the tower clearance analysis, the position of the tip of the blade of the wind turbine may be detected from the first sensitive area.

In a preferred embodiment, a feature point of the tip of the blade may be detected from the image used for tower clearance analysis (or from the first sensitive area), and a coordinate corresponding to the detected feature point of the tip of the blade may be used as the position of the tip of the blade. Here, various methods may be used to detect the feature point of the tip of the blade from the image, which is not limited in the present disclosure. In addition, those skilled in the art may also detect the position of the tip of the blade from the first sensitive area by other methods.

Here, the feature point of the tip of the blade may be a pixel point in the image that satisfies any of the following cases: a pixel point in the image that has a largest gradient value of grayscale, an intersection point of any two or more non-parallel straight lines, and a pixel point where a gradient value of the grayscale is greater than a first set value and a change rate of a gradient direction is greater than a second set value.

Steps of detecting the position of the tip of the blade of the wind turbine from the first sensitive area are described below with reference to FIG. 8.

Figure 8:
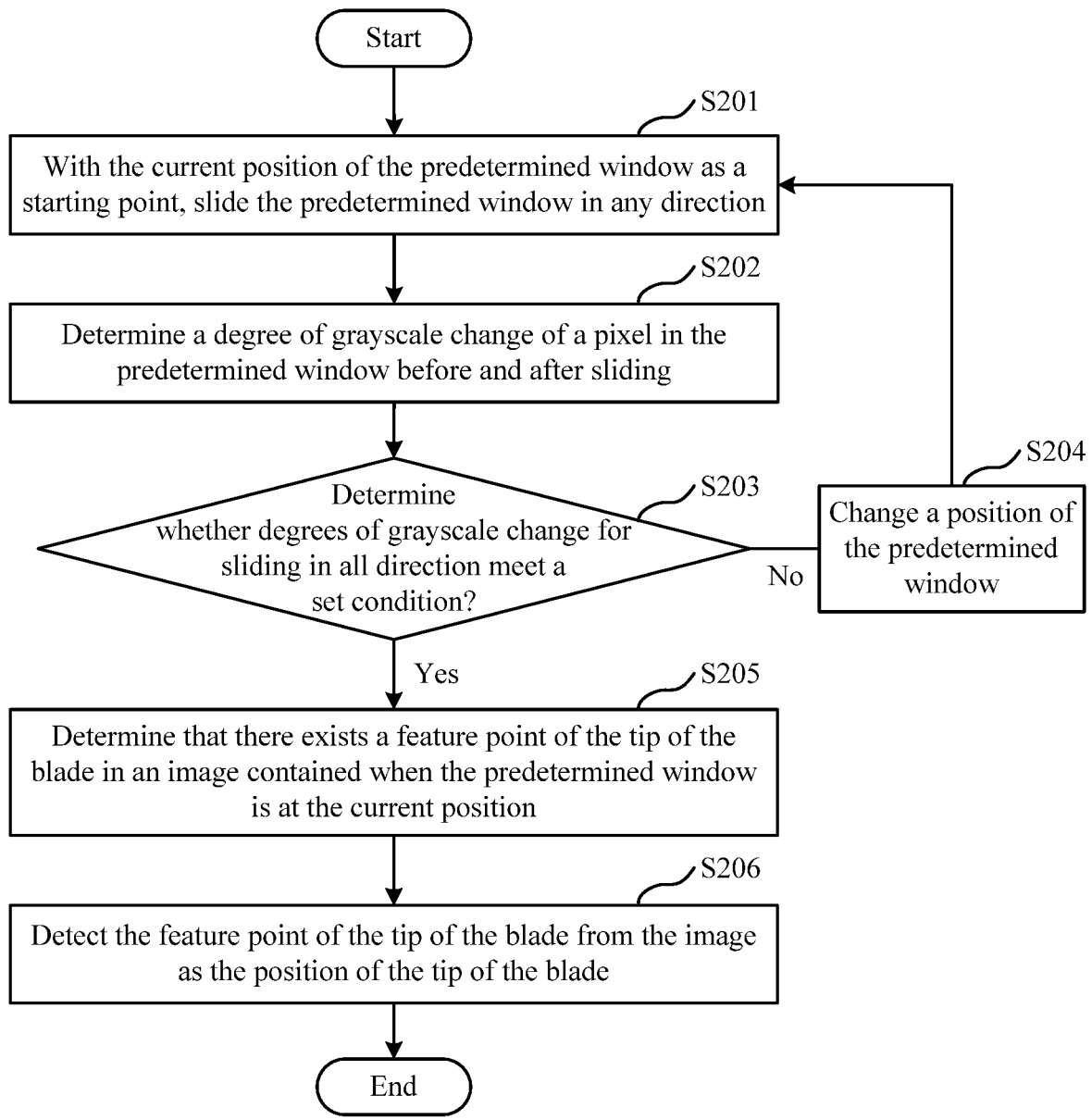
FIG. 8 illustrates a flow chart of steps of detecting a position of a tip of a blade according to an exemplary embodiment of the present disclosure.

FIG. 8 illustrates a flow chart of steps of detecting a position of a tip of a blade according to an exemplary embodiment of the present disclosure. In the exemplary embodiment of the present disclosure, the first sensitive area may be traversed by using a predetermined window, to detect the position of the tip of the blade of the wind turbine from the first sensitive area.

Here, traversing the first sensitive area refers to moving the predetermined window along a preset search route, so as to implement the detection of the feature point of the tip of the blade on the entire first sensitive area.

Here, a window size of the predetermined window may be set according to actual accuracy requirements. Preferably, upon removing the predetermined window, the image included in the predetermined window before the movement may be totally not overlapped with the image included in the predetermined window after the movement, or the image included in the predetermined window before the movement may be partially overlapped with the image included in the predetermined window after the movement, which is not limited in the present disclosure, and those skilled in the art may select according to actual needs. That is to say, those skilled in the art may determine the size of the predetermined window and a moving displacement according to requirements, which is not limited in the present disclosure.

As illustrated in FIG. 8, in step S201, taking a current position of the predetermined window as a starting point, the predetermined window is slid in any direction on the first sensitive area.

In step S202, for sliding in each direction, a degree of grayscale change of a pixel in the predetermined window before and after sliding is determined. As an example, the degree of grayscale change of the pixel may refer to a speed of gradient change of the grayscale of the pixel.

For example, a grayscale change E(u, v) may be produced by sliding the predetermined window by u in a first predetermined direction and by v in a second predetermined direction, as illustrated in the following formula:

$$E(u, v) = \sum_{x,y} w(x, y)[I(x+u, y+v) - I(x, y)]^2 \quad (1)$$

In formula (1), (u, v) represents an offset along the first predetermined direction and the second predetermined direction upon sliding the predetermined window, (x, y) represents the coordinate position of the corresponding pixel in the predetermined window, and w(x, y) is a window function. As an example, the window function may be set to a bivariate normal distribution with a center of the predetermined window as an origin. I(x, y) represents brightness (intensity) of the pixel, and I(x+u, y+v) represents brightness of the pixel after sliding the offset of (u, v).

Due to the following mathematical derivation, that is, $$\sum_{x,y} [I(x+u, y+v) - I(x, y)]^2 =$$

$$\sum_{x,y} [I(x, y) + uI_x + vI_y - I(x, y)]^2 = \sum_{x,y} [u^2 I_x^2 + 2uvI_xI_y + v^2 I_y^2]^2 =$$

$$\sum_{x,y} [u, v] \begin{bmatrix} I_x^2 & I_xI_y \\ I_xI_y & I_y^2 \end{bmatrix} \begin{bmatrix} u \\ v \end{bmatrix} = [u, v] \left( \sum_{x,y} \begin{bmatrix} I_x^2 & I_xI_y \\ I_xI_y & I_y^2 \end{bmatrix} \right) \begin{bmatrix} u \\ v \end{bmatrix},$$

an approximate expression of E(u, v) may be obtained as follows:

$$E(u, v) \cong [u, v] M \begin{bmatrix} u \\ v \end{bmatrix} \quad (2)$$

Where, M is a 2×2 matrix. The expression of matrix M is:

$$M = \sum_{x,y} w(x, y) \begin{bmatrix} I_x^2 & I_xI_y \\ I_xI_y & I_y^2 \end{bmatrix} \quad (3)$$

Thus, the formula (2) may be used to determine the degree of grayscale change of the pixel in the predetermined window before and after sliding. However, the present disclosure is not limited to this, and those skilled in the art may also use other methods to determine the degree of grayscale change.

In step S203, it is to determine whether the degree of grayscale change for sliding in each direction meets a set condition.

The degree of grayscale change of the pixel in the predetermined window before and after sliding meets the set condition means that, the degree of grayscale change corresponding to sliding in each direction is greater than a set change value. For example, a speed of the gradient change of the grayscale of the pixel corresponding to sliding in each direction is greater than the set change value.

If for sliding in all directions, the degree of gradient change of the grayscale of the pixel in the predetermined window before and after sliding does not all meet the set condition, that is, there is a sliding in at least one direction, the degree of gradient change of the grayscale of the pixel in the predetermined window before and after which does not satisfy the set condition, then step S204 is performed. In step S204, the position of the predetermined window on the first sensitive area is changed, and then return to step S201.

For example, when there is a sliding in at least one direction, the degree of gradient change of the grayscale corresponding to which does not satisfy the set condition, it is determined that the degree of gradient change of the grayscale of the pixel in the predetermined window before and after sliding does not all satisfy the set condition.

If, for sliding in all directions, the degree of grayscale change of the pixel in the predetermined window before and after sliding meets the set condition, step S205 is performed. In step S205, it is to determine that there is a feature point of the tip of the blade in an image contained in the predetermined window when the predetermined window is at the current position.

In step S206, the feature point of the tip of the blade is detected from the image contained when the predetermined window is at the current position, and a coordinate corresponding to the detected feature point of the tip of the blade is determined as the position of the tip of the blade.

That is to say, the detection of the feature point of the tip of the blade may be performed by the above steps S201 to S205, and the coordinate corresponding to the detected feature point of the tip of the blade is determined as the position of the tip of the blade. For example, taking the image illustrated in FIG. 4 as an example, the position A of the tip of the blade may be detected from the first sensitive area by the above steps.

As an example, steps of detecting the feature point of the tip of the blade from the image contained when the predetermined window is at the current position may include: determining a pixel with a highest gradient value of grayscale and/or a highest change rate of gradient direction in the image contained when the predetermined window is at the current position as the feature point of the tip of the blade.

Preferably, a response function R of the feature point of the tip of the blade (i.e., a measurement function of the feature point of the tip of the blade) may be defined as the following formula:

$$R=\lambda_1\lambda_2-h(\lambda_1+\lambda_2)^2 \quad (4)$$

In formula (4), $\lambda_1$ is a degree of gradient change in the first predetermined direction, $\lambda_2$ is a degree of gradient change in the second predetermined direction, and h is a response coefficient.

In a preferred embodiment, the value of the response function R of the feature point of the tip of the blade may be compared with a predetermined threshold, and when the value of R is greater than or equal to the predetermined threshold, a pixel corresponding to a local maximum of R is determined as the feature point of the tip of the blade.

It should be understood that, in the above example of detecting the position of the tip of the blade, it is to determine the degree of grayscale change of each pixel in the first sensitive area. Preferably, it may be based on a degree of grayscale change of each sub-pixel in the first sensitive area to detect the position of the tip of the blade, which can improve accuracy of detecting the position of the tip of the blade.

Here, a sub-pixel (Sub-Pixel) is a pixel between two physical pixels (that is, the pixel mentioned above), and the sub-pixel exists in a gap between the physical pixels. That is to say, the detection of the feature point of the tip of the blade may be performed based on the sub-pixel point in the first sensitive area.

It should be understood that due to problems such as blade painting, a tip portion of the blade is sometimes painted in an alternating pattern of red and white colors, which may cause an error in the detection of the feature point of the tip of the blade, and hence may result that multiple feature points of the tip of the blade are detected from the first sensitive area. In order to solve this technical problem, the step of detecting the feature point of the tip of the blade from the first sensitive area may include: detecting multiple candidate feature points of the tip of the blade from the first sensitive area; and determining a final feature point of the tip of the blade from the multiple candidate feature points of the tip of the blade according to a preset condition.

Here, when calculating the tower clearance, the tip of the blade is almost vertically directed to the ground, and the tip of the blade is located at the bottom of the blade, so when multiple candidate feature points of the tip of blade are detected, a candidate feature point of the tip of the blade closest to the ground is most likely the tip of the blade.

In this case, the candidate feature point of the tip of the blade closest to the ground may be selected from the multiple candidate feature points of the tip of the blade as the final feature point of the tip of the blade (i.e., the tip of the blade), based on the relative positional relationship between the image capture device 100 for capturing the image for tower clearance analysis and the wind turbine.

For the case that image capture device 100 is set at the bottom of the nacelle, a point with a largest Y-axis coordinate value (i.e., a candidate feature point of the tip of the blade located at top of the first sensitive area) among the multiple candidate feature points of the tip of the blade is determined as the final feature point of the tip of the blade.

For the case that the image capture device 100 is arranged in the designated area, a point with a smallest Y-axis coordinate value (i.e., a candidate feature point of the tip of the blade located at bottom of the first sensitive area) among the multiple candidate feature points of the tip of the blade is determined as the final feature point of the tip of the blade.

In this case, taking the image illustrated in FIG. 7 as an example, points A, A1, and A2 illustrated in FIG. 7 represent multiple candidate feature points of the tip of the blade obtained when performing the detection of feature point of the tip of the blade based on sub-pixel points in the first sensitive area. At this time, the point A with the smallest Y-axis coordinate value may be determined as the final feature point of the tip of the blade, that is, a coordinate corresponding to point A may be determined as the position of the tip of the blade.

It should be understood that FIG. 8 illustrates steps of detecting the position of the tip of the blade from the first sensitive area by taking the example of extracting the first sensitive area from the image used for the tower clearance analysis. However, the present disclosure is not limited to this, and the method for detecting the position of the tip of the blade illustrated in FIG. 8 is also applicable to the case of detecting the position of the tip of the blade from the image used for tower clearance analysis (from the captured image). In this case, it is necessary to use the predetermined window to traverse the entire image used for the tower clearance analysis. When the predetermined window is at any position on the image used for the tower clearance analysis, the position of the tip of the blade may be detected from the image included in the predetermined window by the method illustrated in FIG. 8.

In addition, the method for detecting the position of the tip of the blade illustrated in FIG. 8 is only an example, and the present disclosure is not limited thereto. Those skilled in the art may also use other image recognition methods to detect the tip of the blade from the image. For example, it is possible to recognize a straight line from an image through a straight line detection method, to determine an intersection point of two or more straight lines as the feature point of the tip of the blade.

Returning to FIG. 1, in step S30, an edge of the tower is recognized from the obtained image.

In an example, a designated point in the image may be used as the edge of the tower. Here, the designated point may be a pixel in the image corresponding to a point on the tower used for determining the tower clearance determined on the basis of the relative relationship between the image capture device and the tower of the wind turbine. In other words, the designated point may be the pixel in the image corresponding to a position where the blade is most likely to contact the tower during operation.

Here, since the relative positional relationship between the image capture device and the wind turbine is fixed, that is, the position of the tower of the wind turbine in the captured image is fixed, then the position of the above-mentioned designated point is also fixed, Therefore, the designated point in the image may be used as the edge of the tower. Subsequently, the distance between the designated point and the tip of the blade may be obtained based on a formula of calculating a distance between two points, as the tower clearance. Taking the image illustrated in FIG. 4 as an example, point B is the designated point in the image serving as the edge of the tower.

In another example, the edge of the tower may be recognized by performing an edge detection (or straight line detection) on the image.

For the above-mentioned case where the second sensitive area is extracted from the image used for the tower clearance analysis, the edge of the tower may be recognized from the second sensitive area. For example, various straight line detection methods may be used to detect a straight line from the second sensitive area, and the detected straight line is used as the edge of the tower. The present disclosure is not limited to this, and other methods may also be used to recognize the edge of the tower from the second sensitive area. For example, the edge of the tower may be determined by recognizing a pre-set identification for indicating the edge of the tower from the second sensitive area.

Steps of recognizing the edge of the tower from the second sensitive area are described below with reference to FIG. 9.

Figure 9:
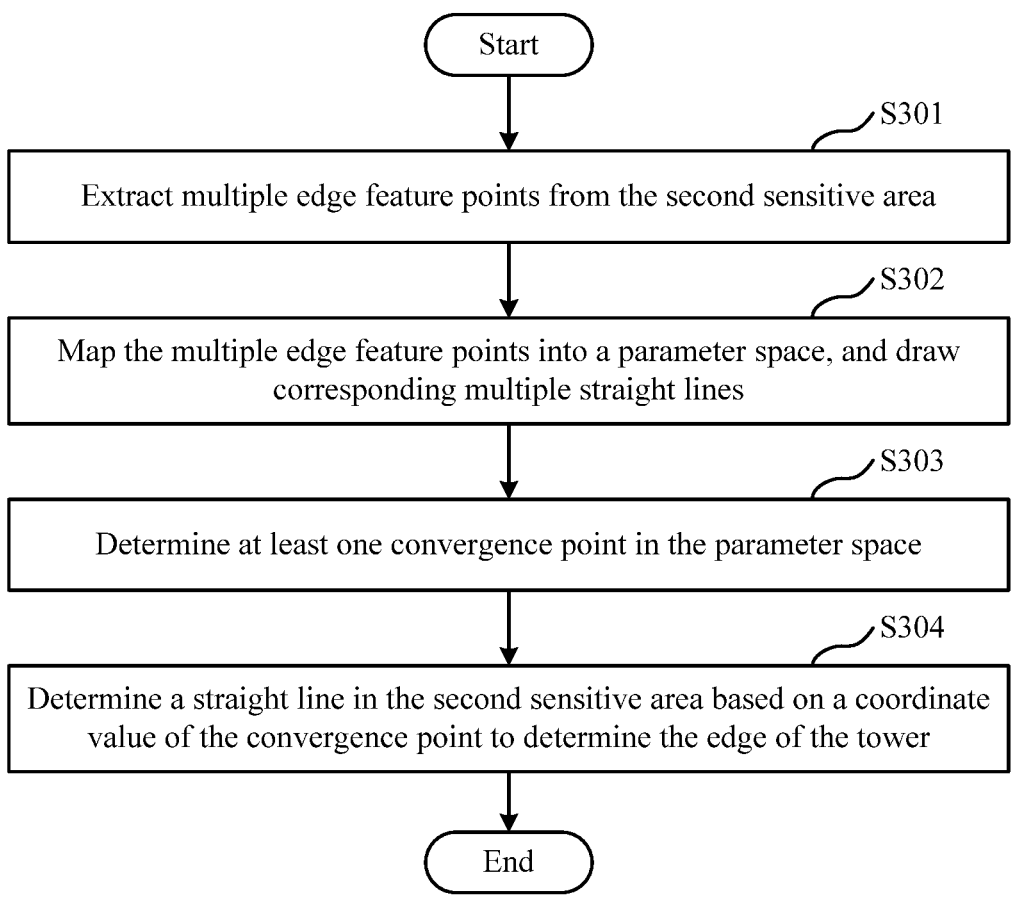
FIG. 9 illustrates a flow chart of steps of recognizing an edge of a tower according to an exemplary embodiment of the present disclosure.

FIG. 9 illustrates a flow chart of steps of recognizing an edge of a tower according to an exemplary embodiment of the present disclosure.

As illustrated in FIG. 9, in step S301, multiple edge feature points are extracted from the second sensitive area. For example, an image of the second sensitive area may be converted into a grayscale image, and edge feature points may be extracted from the converted grayscale image. However, the present disclosure is not limited to this, and the edge feature points may also be extracted in other ways.

In step S302, the extracted multiple edge feature points are mapped into a parameter space, and corresponding multiple straight lines are drawn in the parameter space based on the multiple edge feature points.

For example, considering a correspondence between a point and a straight line, a straight line passing through a point $(x_1, y_1)$ can be expressed as $y_1=k \cdot x_1+b$. After interchanging variables and parameters, when the point $(x_1, y_1)$ is known, a straight line cluster passing through this point can be expressed as $b=(-x_1) \cdot k+y_1$. That is to say, points on the same straight line have the same slope and intercept, reflected in the parameter space (i.e., k-b space) is that straight lines in the straight line cluster will intersect at the same point $(k, b)$.

As an example, suppose that three edge feature points $(1,1)$, $(2,2)$, $(3,3)$ are extracted from the second sensitive area (i.e., an image space), and these three edge feature points are on the straight line $y=1 \cdot x+0$. After interchanging variables and parameters, the three edge feature points correspond to three straight lines in the parameter space, that is, $1=k+b$, $2=2 \cdot k+b$, and $3=3 \cdot k+b$. These three straight lines intersect at the same point $(1,0)$. A horizontal coordinate and a vertical coordinate of the point are the slope and intercept of a line in the image space, respectively. In other words, when the intersection point of multiple straight lines is found in the parameter space, the straight lines in the image space can be determined.

In a preferred example, since above conversion process cannot represent a case where a slope of the straight line is infinite, a polar coordinate (e.g., $Rho=X \cdot \cos \theta + Y \cdot \sin \theta$) may be used to represent a straight line.

In step S303, at least one convergence point in the parameter space is determined. Here, the at least one convergence point is a point passed through by more than a predetermined number of straight lines.

For example, a "vote" method may be applied for points on each line in the parameter space, that is, accumulation. When a line passes through a point in the parameter space, a score of this point is increased by 1. Traverse the k-b space to find a point in the parameter space whose accumulative score is greater than or equal to the predetermined value, as the at least one convergence point.

In step S304, at least one straight line in the second sensitive area is determined based on a coordinate value of the at least one convergence point, and the edge of the tower is determined based on the at least one straight line.

For example, steps of determining the at least one straight line in the second sensitive area based on the coordinate value of the at least one convergence point may include: for each convergence point, taking a horizontal coordinate of the convergence point as a slope of a straight line, and taking a vertical coordinate of the convergence point as an intercept of a straight line, to obtain a straight line corresponding to the convergence point in the second sensitive area. That is to say, it is possible to extract the edge feature points from the second sensitive area (i.e., an image space) based on a predetermined coordinate system of the image space, and after determining the convergence point, the corresponding straight line may be drawn under the predetermined coordinate system.

Preferably, steps of determining the edge of the tower based on the at least one straight line may include: fitting the determined at least one straight line, and determining the edge of the tower based on the fitted straight line obtained by the fitting.

For example, a straight line with a relative distance less than a designated distance may be selected from the at least one straight line for fitting. when one fitted straight line is obtained by fitting, the obtained fitted straight line is used as the edge of the tower; when two fitted straight lines are obtained by fitting, a connecting line connecting midpoints of the two fitted straight lines is used as the edge of the tower.

Taking the image illustrated in FIG. 4 as an example, based on the straight line detection method described above, when a straight line L1 and a straight line L2 in the second sensitive area are obtained by fitting, a connecting line connecting midpoints of the two straight lines may be determined as the edge of the tower.

Taking the image illustrated in FIG. 7 as an example, based on the above straight line detection method, a straight line L in the second sensitive area is obtained by fitting, and the straight line L is determined as the edge of the tower. At this time, a point-to-line distance calculation formula may be used to determine the distance from the tip of the blade to the edge of the tower.

Here, it should be understood that the above method for determining the tower edge by fitting at least one straight line is only an example, and the present disclosure is not limited thereto. Other methods for determining the edge of the tower are also feasible. For example, a length of each straight line may be calculated, and the longest straight line may be selected as the edge of the tower.

It should be understood that FIG. 9 takes the example of extracting the second sensitive area from the image used for the tower clearance analysis as an example to introduce the recognition of the edge of the tower from the second sensitive area. However, the present disclosure is not limited to this. The method for recognizing the edge of the tower illustrated in FIG. 9 is also applicable to a case of recognizing the edge of the tower from the image used for the analysis of the tower clearance. For example, multiple edge feature points may be extracted from the image used for tower clearance analysis, to recognize the edge of the tower.

In addition, the method for recognizing the edge of the tower illustrated in FIG. 9 is only an example, and the present disclosure is not limited thereto. Those skilled in the art may also use other image recognition methods to recognize the edge of the tower from the image. For example, edge information may be extracted from the second sensitive area, such as extracting multiple edge points, and fitting the multiple edge points to obtain an edge straight line as the edge of the tower.

Returning to FIG. 1, in step S40, a distance from the tip of the blade to the edge of the tower is calculated based on the determined position of the tip of the blade and the recognized edge of the tower, to obtain the tower clearance. For example, a vertical distance from the position of the tip of the blade (such as a coordinate position) to a straight line corresponding to the edge of the tower may be calculated as the tower clearance.

As an example, steps of calculating the distance from the tip of the blade to the edge of the tower based on the determined position of the tip of the blade and the recognized edge of the tower, to obtain the tower clearance may include: calculating a pixel distance from the tip of the blade to the edge of the tower based on the determined position of the tip of the blade and the recognized edge of the tower; and based on a predetermined correspondence between a pixel distance and an actual distance of any two pixels, calculating an actual distance from the tip of the blade to the edge of the tower by using the pixel distance from the tip of the blade to the edge of the tower, and determining the actual distance as the tower clearance. Here, any two pixels may be two adjacent pixels or two designated pixels on the image.

Figure 10:
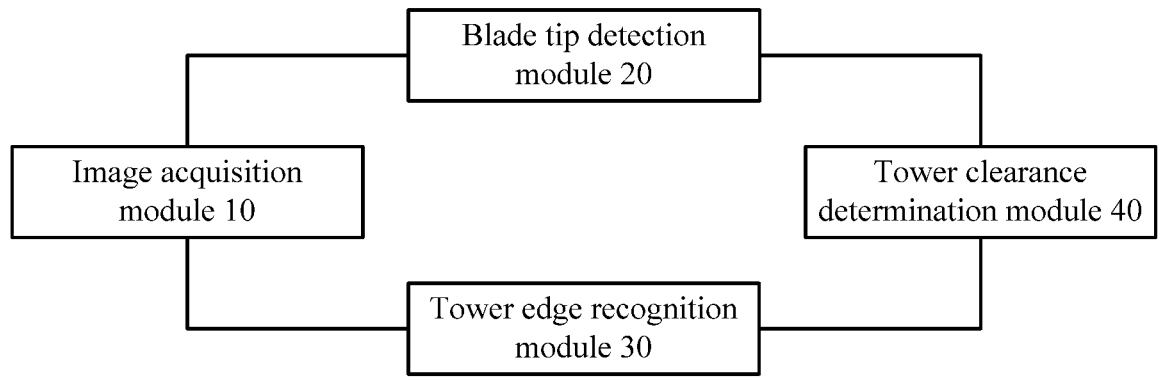
FIG. 10 illustrates a block diagram of an apparatus for determining a tower clearance of a wind turbine according to an exemplary embodiment of the present disclosure.

FIG. 10 illustrates a block diagram of an apparatus for determining a tower clearance of a wind turbine according to an exemplary embodiment of the present disclosure.

As illustrated in FIG. 10, the apparatus for determining a tower clearance of a wind turbine according to the exemplary embodiment of the present disclosure includes an image acquisition module 10, a blade tip detection module 20, a tower edge recognition module 30, and a tower clearance determination module 40.

Specifically, the image acquisition module 10 is configured to obtain an image of the wind turbine during operation. A tip of a blade and a tower of the wind turbine are captured in the obtained image.

For example, the image acquisition module 10 may capture an image of a blade of a wind turbine during operation. An image including the tip of the blade and the tower of the wind turbine included in the image during operation of the blade is determined as an image for tower clearance analysis.

In a preferred embodiment, an image capture device may be used to capture the image of the blade of the wind turbine during operation, and then the image capture device sends the captured image to the image acquisition module 10.

An installation position of the image capture device 100 may be reasonably set to enable the image capture device to capture the image including the tip of the blade and the tower of the wind turbine. Two installation examples of the image capture device are described below.

In a first case, the image capture device may be installed at a bottom of a nacelle of the wind turbine, to capture the image including the tip of the blade and the tower of the wind turbine.

In a second case, the image capture device may be arranged in a designated area located on a side of the wind turbine and at a predetermined distance from the wind turbine, to capture the image including the tip of the blade and the tower the wind turbine.

Here, since the installation position of the image capture device is fixed, the relative positional relationship between the image capture device and the wind turbine is also fixed. Thus, in the image captured by the image capture device, it is also relatively fixed with respect to which area may contain the tower and which area may contain the blade.

In view of the above, preferably, the apparatus for determining the tower clearance of the wind turbine according to an exemplary embodiment of the present disclosure may further include: a sensitive area extraction module (which is not illustrated in Figures), configured to extract from the obtained image a first sensitive area for detecting the tip of the blade and a second sensitive area for recognizing the edge of the tower. Subsequently, the tower clearance analysis may be performed on the extracted first sensitive area and the second sensitive area.

The blade tip detection module 20 is configured to determine a position of the tip of the blade of the wind turbine from the obtained image.

For the above-mentioned case where the first sensitive area is extracted from the image used for the tower clearance analysis, the blade tip detection module 20 may determine the position of the tip of the blade of the wind turbine from the first sensitive area.

Specifically, the blade tip detection module 10 may traverse the first sensitive area by using a predetermined window. When the predetermined window is at any position on the first sensitive area, the blade tip detection module 20 may detect the position of the tip of the blade from an image contained in the predetermined window in the following manners.

using the any position as a starting point, the predetermined window is slide in any direction on the first sensitive area; for sliding in each direction, degrees of grayscale change of a pixel in the predetermined window before and after sliding are determined, and it is to determine whether the degree of grayscale change meets a set condition; if, for sliding in all directions, the degrees of grayscale change of the pixel in the predetermined window before and after sliding all meet the set condition, it is determined that there is a feature point of the tip of the blade in an image contained when the predetermined window is at the any position. The feature point of the tip of the blade is detected from the image contained when the predetermined window is at the any position, and a coordinate corresponding to the detected feature point of the tip of the blade is determined as the position of the tip of the blade.

As an example, the blade tip detection module 20 may determine a pixel with a highest gradient value of grayscale and/or a highest change rate of gradient direction in the image contained when the predetermined window is at the any position as the feature point of the tip of the blade. However, the present disclosure is not limited to this, and an intersection point of any two or more non-parallel straight lines may be determined as the feature point of the tip of the blade.

In a preferred embodiment, the blade tip detection module 20 may detect multiple candidate feature points of the tip of the blade from the first sensitive area, and determine a final feature point of the tip of the blade from the multiple candidate feature points of the tip of the blade according to a preset condition.

The blade tip detection module 20 is configured to select a candidate feature point of the tip of the blade closest to a ground among the multiple candidate feature points of the tip of the blade as the final feature point of the tip of the blade, based on a relative positional relationship between the image capture device 100 for capturing the image for tower clearance analysis and the wind turbine.

For the case that image capture device is set at the bottom of the nacelle, the blade tip detection module 20 may determine a point with a largest Y-axis coordinate value among the multiple candidate feature points of the tip of the blade as the final feature point of the tip of the blade.

For the case that the image capture device is arranged in the designated area, the blade tip detection module 20 may determine a point with a smallest Y-axis coordinate value among the multiple candidate feature points of the tip of the blade as the final feature point of the tip of the blade.

The tower edge recognition module 30 is configured to recognize an edge of the tower from the obtained image.

For example, for the above-mentioned case where the second sensitive area is extracted from the image used for the tower clearance analysis, the tower edge recognition module 30 may recognize the edge of the tower from the second sensitive area.

In one example, the tower edge recognition module 30 may use a designated point in the image as the edge of the tower. Here, the designated point may be a pixel in the image corresponding to a point on the tower used for determining the tower clearance determined on the basis of the relative relationship between the image capture device and the tower of the wind turbine. In other words, the designated point may be a pixel in the image corresponding to a position where the blade is most likely to contact the tower during operation.

In another example, the tower edge recognition module 30 may recognize the edge of the tower by performing an edge detection on the image.

The tower edge recognition module 30 may use various image recognition methods to detect the edge of the tower from the second sensitive area. A function of the tower edge recognition module 30 will be described below with reference to FIG. 11. It should be understood that the method for recognizing the edge of the tower illustrated in FIG. 11 is only a preferred example, and other image recognition methods for recognizing the edge of the tower are also feasible.

Figure 11:
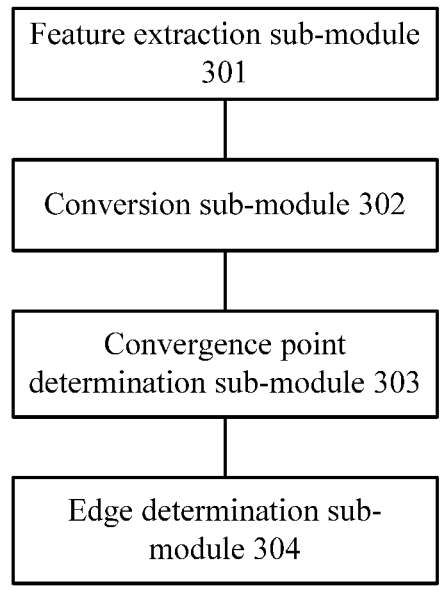
FIG. 11 illustrates a block diagram of a tower edge recognition module according to an exemplary embodiment of the present disclosure.

FIG. 11 illustrates a block diagram of a tower edge recognition module 30 according to an exemplary embodiment of the present disclosure.

As illustrated in FIG. 11, the tower edge recognition module 30 according to an exemplary embodiment of the present disclosure may include a feature extraction sub-module 301, a conversion sub-module 302, a convergence point determination sub-module 303, and an edge determination sub-module 304.

Specifically, the feature extraction sub-module 301 is configured to extract multiple edge feature points from the second sensitive area. For example, the feature extraction sub-module 301 may convert an image corresponding to the second sensitive area into a grayscale image, and extract edge feature points from the converted grayscale image.

The conversion sub-module 302 is configured to map the multiple edge feature points into a parameter space, and draw corresponding multiple straight lines in the parameter space based on the multiple edge feature points.

Since a detailed process of obtaining multiple straight lines by the conversion sub-module 302 has been described in step 302 of FIG. 9, the content of this will not be repeated here in the present disclosure.

The convergence point determination sub-module 303 is configured to determine at least one convergence point in the parameter space, here the at least one convergence point is a point passed through by more than a predetermined number of straight lines.

Since the a process of determining at least one convergence point by the convergence point determination sub-module 303 has been described in step 303 of FIG. 9, the content of this will not be repeated here in the present disclosure.

The edge determination sub-module 304 is configured to determine at least one straight line in the second sensitive area based on a coordinate value of the at least one convergence point, and determine the edge of the tower based on the at least one straight line.

For example, for each convergence point, the edge determination sub-module 304 takes a horizontal coordinate of the convergence point as a slope of a straight line, and takes a vertical coordinate of the convergence point as an intercept of a straight line, to obtain a straight line corresponding to the convergence point in the second sensitive area.

For example, the edge determination sub-module 304 may select a straight line with a relative distance less than a designated distance from the at least one straight line for fitting. When one fitted straight line is obtained by fitting, the obtained fitted straight line is used as the edge of the tower; when two fitted straight lines are obtained by fitting, a connecting line connecting midpoints of the two fitted straight lines is used as the edge of the tower.

Returning to FIG. 10, the tower clearance determination module 40 is configured to calculate a distance from the tip of the blade to the edge of the tower based on the determined position of the tip of the blade and the recognized edge of the tower, to obtain the tower clearance. For example, the tower clearance determination module 40 may calculate a vertical distance from the position of the tip of the blade to a straight line corresponding to the edge of the tower as the tower clearance.

The tower clearance determination module 40 may calculate a pixel distance from the tip of the blade to the edge of the tower based on the determined position of the tip of the blade and the recognized edge of the tower; and based on a predetermined correspondence between a pixel distance and an actual distance of any two pixels, calculate an actual distance from the tip of the blade to the edge of the tower by using the pixel distance from the tip of the blade to the edge of the tower, and determine the actual distance as the tower clearance.

A computer readable storage medium with computer programs stored thereon is also provided in an exemplary embodiment of the present disclosure. The computer readable storage medium stores computer programs that, when executed by a processor, cause the processor to perform the above method for determining a tower clearance of the wind turbine. The computer readable storage medium is any data storage device that can store data read by a computer system. Examples of the computer readable storage medium include: read-only memory, random-access memory, read-only optical disks, magnetic tapes, floppy disks, optical data storage devices, and carrier waves (such as data transmission through the Internet via a wired or wireless transmission path).

With the method and the apparatus for determining a tower clearance of the wind turbine according to exemplary embodiments of the present disclosure, the tower clearance of the wind turbine can be monitored in real time, so as to effectively avoid losses due to hitting the tower by the blade.

In addition, in the method and apparatus for determining the tower clearance of the wind turbine according to the exemplary embodiments of the present disclosure, a stand for supporting the image capture device is rationally designed and the installation position of the image capture device is rationally selected, which can not only fully realize the video monitoring function of the tower clearance, but also guarantee a safe operation of the wind turbine.

In addition, the method and apparatus for determining the tower clearance of the wind turbine according to the exemplary embodiments of the present disclosure can easily obtain the tower clearance of the wind turbine without manual measurements, which is convenient and quick.

In addition, the method and apparatus for determining the tower clearance of the wind turbine according to the exemplary embodiments of the present disclosure detect the tip of the blade by detecting the feature point of the tip of the blade, and can also recognize the edge of the tower by the straight line detection method, thereby obtaining the distance between the tip of the blade and the edge of the tower.

In addition, the method and apparatus for determining the tower clearance of the wind turbine according to the exemplary embodiments of the present disclosure use monocular vision technology to achieve high-precision measurement of tower clearance.

Although the present disclosure is described in detail with reference to the above embodiments, those skilled in the art should understand that, various modifications and changes may be made to the above embodiments without deviating from the spirit and the scope of the present disclosure defined by the claims.

The invention claimed is:

1. A method for determining a tower clearance of a wind turbine, comprising:
    obtaining an image of a wind turbine during operation, wherein the image of the wind turbine is captured by an image capture device, and the image capture device is installed at a bottom of a nacelle of the wind turbine, and wherein a tip of a blade and a tower of the wind turbine is comprised in the image;
    determining a position of the tip of the blade of the wind turbine from the obtained image;
    recognizing an edge of the tower from the obtained image; and
    calculating a distance from the tip of the blade to the edge of the tower based on the determined position of the tip of the blade and the recognized edge of the tower, to obtain a tower clearance,
    wherein the calculating the distance from the tip of the blade to the edge of the tower based on the determined position of the tip of the blade and the recognized edge of the tower, to obtain the tower clearance comprises:
        calculating a pixel distance from the tip of the blade to the edge of the tower based on the determined position of the tip of the blade and the recognized edge of the tower; and
        based on a predetermined correspondence between a pixel distance and an actual distance of any two pixels, calculating an actual distance from the tip of the blade to the edge of the tower by using the pixel distance from the tip of the blade to the edge of the tower, and determining the actual distance as the tower clearance.

2. The method according to claim 1, the method further comprises:
    extracting, from the obtained image, a first sensitive area for detecting the tip of the blade and a second sensitive area for recognizing the edge of the tower,
    determining the position of the tip of the blade of the wind turbine from the first sensitive area, and
    recognizing the edge of the tower from the second sensitive area.

3. The method according to claim 2, wherein the determining the position of the tip of the blade of the wind turbine from the first sensitive area comprises:
    traversing the first sensitive area by using a predetermined window, wherein when the predetermined window is at any position on the first sensitive area, detecting the position of the tip of the blade from an image contained in the predetermined window in a following manner:
    with the any position as a starting point, sliding the predetermined window in any direction on the first sensitive area;
    for sliding in each direction, determining a degree of grayscale change of a pixel in the predetermined window before and after sliding, and determining whether the degree of grayscale change meets a set condition;
    if, for sliding in all directions, the degree of grayscale change of the pixel in the predetermined window before and after sliding meets the set condition, determining that there exists a feature point of the tip of the blade in the image contained when the predetermined window is at the any position; and
    detecting the feature point of the tip of the blade from the image contained when the predetermined window is at the any position, and determining a coordinate corresponding to the detected feature point of the tip of the blade as the position of the tip of the blade.

4. The method according to claim 3, wherein the detecting the feature point of the tip of the blade from the image contained when the predetermined window is at the any position comprises:
   determining a pixel with a highest gradient value of grayscale and/or a highest change rate of gradient direction in the image contained when the predetermined window is at the any position as the feature point of the tip of the blade.

5. The method according to claim 2, wherein the determining the position of the tip of the blade of the wind turbine from the first sensitive area comprises:
   detecting a plurality of candidate feature points of the tip of the blade from the first sensitive area; and
   determining a final feature point of the tip of the blade from the plurality of candidate feature points of the tip of the blade according to a preset condition.

6. The method according to claim 5, wherein
   the determining the final feature point of the tip of the blade from the plurality of candidate feature points of the tip of the blade according to the preset condition comprises:
   determining a point with a largest Y-axis coordinate value among the plurality of candidate feature points of the tip of the blade as the final feature point of the tip of the blade.

7. The method according to claim 2, wherein the recognizing the edge of the tower from the second sensitive area comprises:
   extracting a plurality of edge feature points from the second sensitive area;
   mapping the plurality of edge feature points into a parameter space, and drawing corresponding plurality of straight lines in the parameter space based on the plurality of edge feature points;
   determining at least one convergence point in the parameter space, wherein the at least one convergence point is a point passed through by more than a predetermined number of straight lines; and
   determining at least one straight line in the second sensitive area based on a coordinate value of the at least one convergence point, and determining the edge of the tower based on the at least one straight line.

8. The method according to claim 7, wherein the determining the at least one straight line in the second sensitive area based on the coordinate value of the at least one convergence point comprises:
   for each convergence point, taking a horizontal coordinate of the convergence point as a slope of a straight line, and taking a vertical coordinate of the convergence point as an intercept of a straight line, to obtain the straight line corresponding to the convergence point in the second sensitive area.

9. The method according to claim 7, wherein the determining the edge of the tower based on the at least one straight line comprises:
   when one fitted straight line is obtained by fitting the at least one straight line, using the obtained fitted straight line as the edge of the tower; alternatively,
   when two fitted straight lines are obtained by fitting the at least one straight line, taking a connecting line connecting midpoints of the two fitted straight lines as the edge of the tower.

10. A non-transitory computer readable storage medium with computer programs stored thereon, wherein the computer programs, when executed by a processor, perform the method for determining the tower clearance of the wind turbine according to claim 1.

11. An apparatus for determining a tower clearance of a wind turbine, comprising a processor and a memory storing computer programs, wherein the computer programs when executed by the processor cause the processor to:
   obtain an image of the wind turbine during operation, wherein the image of the wind turbine is captured by an image capture device, and the image capture device is installed at a bottom of a nacelle of the wind turbine, and wherein a tip of a blade and a tower of the wind turbine are comprised in the image;
   determine a position of the tip of the blade of the wind turbine from the obtained image;
   recognize an edge of the tower from the obtained image; and
   calculate a distance from the tip of the blade to the edge of the tower based on the determined position of the tip of the blade and the recognized edge of the tower, to obtain a tower clearance,
   wherein the computer programs when executed by the processor further cause the processor to:
   calculate a pixel distance from the tip of the blade to the edge of the tower based on the determined position of the tip of the blade and the recognized edge of the tower; and
   based on a predetermined correspondence between a pixel distance and an actual distance of any two pixels, calculate an actual distance from the tip of the blade to the edge of the tower by using the pixel distance from the tip of the blade to the edge of the tower, and determine the actual distance as the tower clearance.

12. A system for monitoring a tower clearance, comprising:
   an image capture device, configured to capture an image of a wind turbine during operation of a blade, wherein the image capture device is installed at a bottom of a nacelle of the wind turbine; and
   a processor, configured to:
   obtain an image including a tip of the blade and a tower of the wind turbine from the captured image;
   determine a position of the tip of the blade of the wind turbine from the obtained image;
   recognize an edge of the tower from the obtained image; and
   calculate a distance from the tip of the blade to the edge of the tower based on the determined position of the tip of the blade and the recognized edge of the tower, to obtain a tower clearance,
   wherein the processor is further configured to:
   calculate a pixel distance from the tip of the blade to the edge of the tower based on the determined position of the tip of the blade and the recognized edge of the tower; and
   based on a predetermined correspondence between a pixel distance and an actual distance of any two pixels, calculate an actual distance from the tip of the blade to the edge of the tower by using the pixel distance from the tip of the blade to the edge of the tower, and determine the actual distance as the tower clearance.

* * * * *